April 1, 1924.
J. ROBERTSON
FLOAT CONTROLLED VALVE
Filed June 14, 1922
1,488,835
2 Sheets-Sheet 1
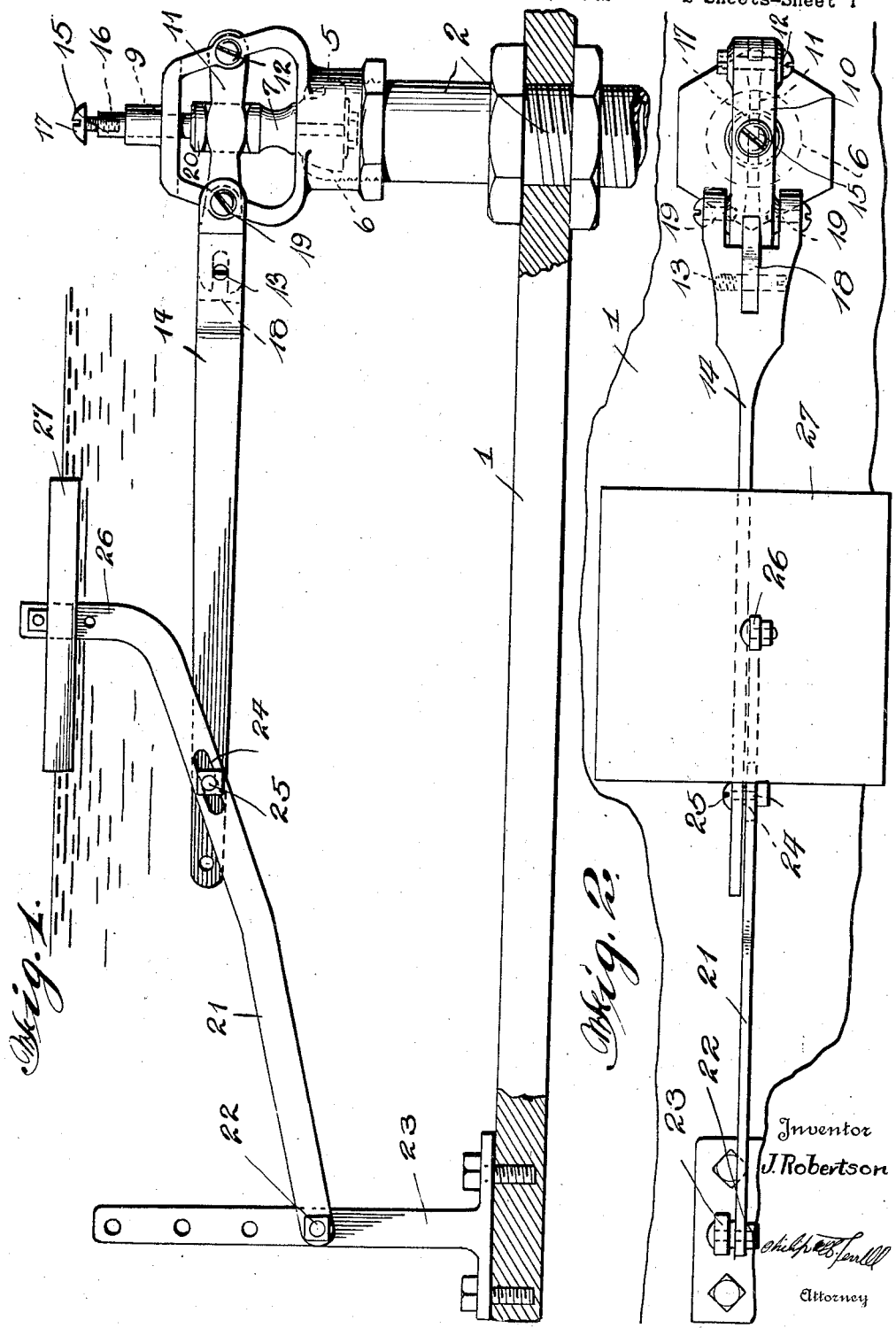

April 1, 1924.
J. ROBERTSON
FLOAT CONTROLLED VALVE
1,488,835
Filed June 14, 1922  2 Sheets-Sheet 2
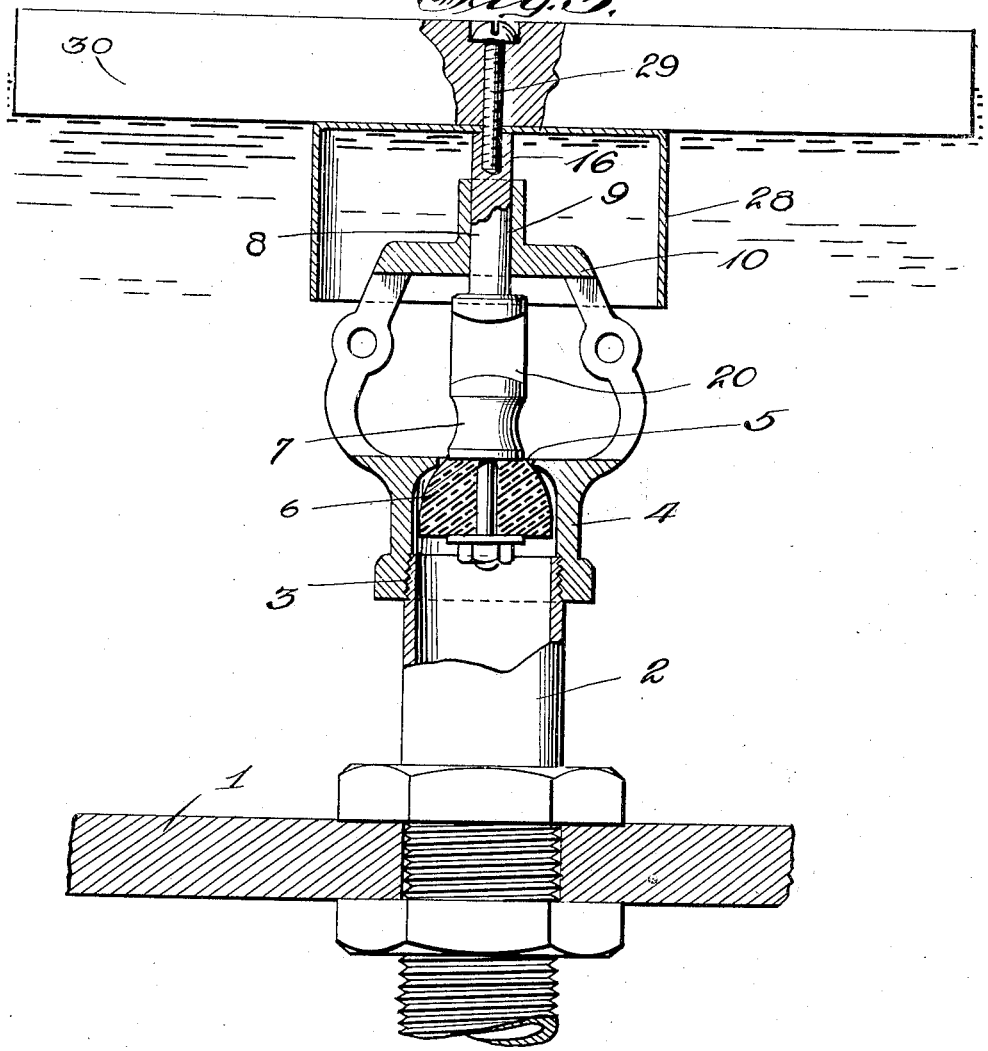
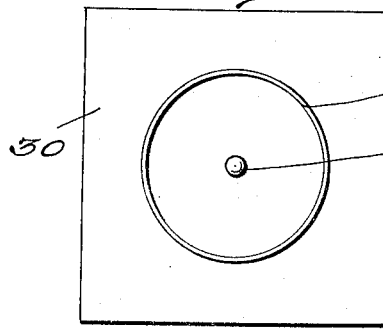
Inventor
J. Robertson
By Philip A. H. Terrell
Attorney Patented Apr. 1, 1924.

1,488,835

UNITED STATES PATENT OFFICE.

JEREMY ROBERTSON, OF SHELBY, IOWA.

FLOAT-CONTROLLED VALVE.

Application filed June 14, 1922. Serial No. 568,151.

*To all whom it may concern:*

Be it known that JEREMY ROBERTSON, citizen of the United States, residing at Shelby, in the county of Shelby and State of Iowa, has invented certain new and useful Improvements in Float-Controlled Valves, of which the following is a specification, reference being had therein to the accompanying drawings.

The invention relates to float controlled valves of the water supply regulator type, and has for its object to provide a lever actuated valve, said lever having connected thereto a second lever which is pivoted at one of its ends and pivoted to the valve controlling lever and provided with a float, said double leverage forming means for preventing the bobbing action of the float and consequent unseating of the valve.

A further object is to provide in combination with a float controlled valve, the valve being vertically movable through a lever connection and provided with a valve stem vertically movable in a yoke, a headed member carried by the valve stem and forming means for preventing the valve and valve stem from dropping downwardly when the lever means is detached. The headed member also forms means whereby a float may be attached directly to the valve stem.

With the above and other objects in view the invention resides in the combination and arrangement of parts as hereinafter set forth, shown in the drawings described and claimed, it being understood that changes in the precise embodiment of the invention may be made within the scope of what is claimed without departing from the spirit of the invention.

In the drawings:—

Figure 1 is a side elevation of the device.

Figure 2 is a top plan view.

Figure 3 is an enlarged side elevation of the valve, parts being in section, showing a float applied thereto.

Figure 4 is a bottom plan view of the float and cup shown in Figure 3.

Referring to the drawings, the numeral 1 designates the bottom of a tank and 2 an upwardly extending water supply pipe carried thereby. The upper end of the water supply pipe 2 has threaded thereon at 3 a sleeve 4, which sleeve is provided with a valve seat 5, with which the semi-spherical valve 6 cooperates. The valve 6 may be formed from any kind of material, and is carried by the vertically movable member 7. The upper end of the member 7 terminates in a stem 8, which is slidably mounted in a vertically disposed bearing 9 of a yoke 10 carried by the sleeve 4. It will be seen that the valve 6 and the member 7 move vertically. However it has been found that when the member 7 is released by the removal of the pivoted link 11 which is pivoted at 12 to the yoke 10 and at 13 to the operating lever 14, the member 7 and the valve drops downwardly into the supply pipe 2 and often entails considerable work and time in recovering the same. To obviate this difficulty a headed screw 15 is threaded in the threaded aperture 16 of the stem 8. The head 17 of the screw is of greater diameter than the bearing 9, consequently the screw will prevent the member 7 from being lost as above set forth. The outer end of the link 11 extends into a bifurcation 18 of the operating lever 14, and the operating lever 14 is pivotally connected at 19 to the yoke 10, therefore it will be seen that as the lever 14 moves downwardly the outer end of the link 11 will be moved downwardly and as the link extends through the recess 20 in the member 7, the valve 6 will be unseated thereby allowing water to enter the tank. When the lever 14 moves upwardly the valve 6 is moved to closed position.

It has been found that where floats are applied directly to the operating lever of a valve of this character that considerable bobbing of the float takes place, which involves unseating of the valve intermittently until the proper level of water is obtained. To obviate this difficulty the lever 21 is provided, which lever is pivotally connected at 22 to a standard 23 carried by the bottom 1 of the tank, and on which standard the lever 21 may be adjusted. The lever 21 is provided with an elongated slot 24 through which the bolt 25 carried by the outer end of the lever 14 extends. The lever 21 extends above the lever 14 and terminates in a vertically disposed portion 26 on which the float 27 is disposed. The double lever operating mechanism for the valve steadies the float and insures a positive operation.

When it is desired to operate the valve 6 by a float direct, a cup 28 is placed in inverted position as shown in Figure 3 on the upper end of the stem 8 and then a screw 29 is passed through the float 30 and threaded into the threaded aperture 16 of the stem 8, after which the operating lever 14 and the link 11 is removed, thereby allowing the valve to be actuated entirely by the float 30.

From the above it will be seen that a float controlled valve is provided wherein bobbing of the float is reduced to a minimum and wherein loss of the valve during assembling or disassembling of the device is obviated. It will also be seen that means is provided whereby the float may be attached directly to the valve if so desired.

The invention having been set forth what is claimed as new and useful is:—

1. The combination with a vertically movable valve, said valve being carried by a vertically movable member, said vertically movable member having a reduced portion, of a yoke carried by a supply pipe and having a vertical bearing to slidably receive said reduced portion, of means for preventing said vertically movable member from dropping into the supply pipe when its operating mechanism is detached, said means comprising a headed member extending into the upper end of the reduced portion of the movable member and having its head of greater diameter than the bearing in which the reduced portion is mounted.

2. The combination with a vertically movable valve, said valve being carried by a vertically movable member slidably mounted in a bearing, an enlarged member carried by the upper end of the vertically movable member and of greater width than its bearing, a pivoted operating lever for actuating said vertically movable member, said lever having pivotally connected thereto, a link, said link being pivoted at its other end and extending through a recess in the vertically movable member, said lever being substantially horizontally disposed, a second lever, said second lever being pivoted at a point remote from the end of the operating lever and extending inwardly towards the operating lever and having a pivotal connection therewith, said second lever extending upwardly and provided with a float disposed above the operating lever.

3. The combination with a float controlled valve actuated by a pivoted horizontal lever, of means for attaching a float to said operating lever, said means comprising a second lever pivoted adjacent the operating lever and having a pivotal connection therewith, said second lever terminating in an upwardly extending arm and a float carried by said upwardly extending arm.

In testimony whereof I hereunto affix my signature.

JEREMY ROBERTSON.